(12) United States Patent
Yano et al.

(10) Patent No.: US 8,792,456 B2
(45) Date of Patent: Jul. 29, 2014

(54) WIRELESS COMMUNICATION APPARATUS, RECEIVING METHOD, AND MOBILE STATION

(75) Inventors: Tetsuya Yano, Yokosuka (JP); Kazuhisa Obuchi, Yokohama (JP); Shunji Miyazaki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 2718 days.

(21) Appl. No.: 11/067,290

(22) Filed: Feb. 28, 2005

(65) Prior Publication Data

US 2005/0232202 A1 Oct. 20, 2005

(30) Foreign Application Priority Data

Apr. 14, 2004 (JP) ................................. 2004-119554

(51) Int. Cl.
*H04W 74/04* (2009.01)

(52) U.S. Cl.
USPC ............ 370/335; 370/337; 370/341; 370/342

(58) Field of Classification Search
USPC ............ 370/320, 35, 342, 441, 335, 337, 341
See application file for complete search history.

(56) References Cited

U.S. PATENT DOCUMENTS

| | | | |
|---|---|---|---|
| 5,410,536 A | 4/1995 | Shah et al. | |
| 7,061,892 B2 * | 6/2006 | Takano | 370/335 |
| 2002/0170013 A1* | 11/2002 | Bolourchi et al. | 714/758 |
| 2003/0031119 A1* | 2/2003 | Kim et al. | 370/200 |
| 2003/0147371 A1 | 8/2003 | Choi | |
| 2005/0068990 A1* | 3/2005 | Liu | 370/516 |
| 2007/0173262 A1* | 7/2007 | Rudolf et al. | 455/450 |

FOREIGN PATENT DOCUMENTS

| | | |
|---|---|---|
| EP | 1355430 | 10/2003 |
| EP | 1931074 | 6/2008 |
| JP | 03297236 | 12/1991 |
| JP | 04117890 | 4/1992 |
| JP | 5503197 | 5/1993 |
| JP | 09064812 | 3/1997 |
| JP | 09-153924 | 6/1997 |
| JP | 2003284135 A | 10/2003 |

OTHER PUBLICATIONS

3GPP TS 25.212 V6.2.0 (Jun. 2004) $3^{rd}$ Generation Partnership Project; Technical Specification Group Radio Access Network; Multiplexing and Channel Coding (FDD) (Release 6).

3GPP TS 25.214 V6.2.0 (Jun. 2004); $3^{rd}$ Generation Partnership Project; Technical Specification Group Radio ACcess Network; Physical Layer Procedures (FDD) (Release 6).

(Continued)

*Primary Examiner* — Patrick Edouard
*Assistant Examiner* — Julio Perez
(74) *Attorney, Agent, or Firm* — Smith, Gambrell & Russell, LLP

(57) ABSTRACT

In this invention a wireless apparatus for conducting receiving process of data using a control signal which is started in transmission prior to transmission of such data is characterized in comprising a detecting unit for detecting that the undefined data is included in a first part transmitted prior to a second part as a part of the control signal is used for solving problem.

11 Claims, 5 Drawing Sheets

(56) References Cited

OTHER PUBLICATIONS

Chinese Office Action dated Sep. 5, 2008 with English Translation in corresponding Chinese application No. 200510058905.5.
Universal Mobile Telecommunications System (UMTS); Multiplexing and channel coding (FDD)(3GPP TS 25.212 version 6.1.0 Release 6)—(Mar. 1, 2004).
Universal Mobile Telecommunications System (UMTS); Spreading and modulation (FDD)(3GPP TS 25.213 version 6.0.0 Release 6)—(Dec. 1, 2003).
Universal Mobile Telecommunications System (UMTS); Physical layer procedures (FDD) (3GPP TS 25.214 version 6.1.0 Release 6)—(Mar. 1, 2004).
European Search Report dated Sep. 8, 2009 issued in EP Patent Application No. 05251753.9-2415/1587236.
Notification of the Reasons for Refusal dated Mar. 6, 2012 received in Japanese Patent Application No. 2009-231543.
European office action dated May 4, 2010 for application No. 05 251 753.9-2415.
Notification of Reason for Refusal Japanese Office Action dated Aug. 7, 2012 issued in corresponding Japanese Patent Application No. 2009-231542.
Siemens, Fast CQI Requesting, 3GPP R1-021296 dated Nov. 8, 2002.
NEC, ACK/NACK repetition 3GPP R1-040181, Feb. 20, 2004.
Interdigital Communications Corporation, Clarification of HS-SCCH reception, 3GPP R1-040193, dated Feb. 20, 2004.
European office action dated Mar. 28, 2011 for application No. 05 251 753.9-2415.
Notification of Reason for Refusal dated Apr. 10, 2012 received in Japanese Patent Application No. 2009-231542.

\* cited by examiner

Fig. 2

| O\P | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | 000 | 001 | 010 | 011 | 100 | 101 | 110 | 111 | 110 | 101 | 100 | 011 | 010 | 001 | 000 |
| 1 | 0000 | 0000 | 0000 | 0000 | 0000 | 0000 | 0000 | 1111 | 1111 | 1111 | 1111 | 1111 | 1111 | 1111 | 1111 |
| 2 | 0001 | 0001 | 0001 | 0001 | 0001 | 0001 | 0001 | 1110 | 1110 | 1110 | 1110 | 1110 | 1110 | 1110 | |
| 3 | 0010 | 0010 | 0010 | 0010 | 0010 | 0010 | 0010 | 1101 | 1101 | 1101 | 1101 | 1101 | 1101 | | |
| 4 | 0011 | 0011 | 0011 | 0011 | 0011 | 0011 | 0011 | 1100 | 1100 | 1100 | 1100 | 1100 | | | |
| 5 | 0100 | 0100 | 0100 | 0100 | 0100 | 0100 | 0100 | 1011 | 1011 | 1011 | 1011 | | | | |
| 6 | 0101 | 0101 | 0101 | 0101 | 0101 | 0101 | 0101 | 1010 | 1010 | 1010 | | | | | |
| 7 | 0110 | 0110 | 0110 | 0110 | 0110 | 0110 | 0110 | 1001 | 1001 | | | | | | |
| 8 | 0111 | 0111 | 0111 | 0111 | 0111 | 0111 | 0111 | 1000 | | | | | | | |
| 9 | 1000 | 1000 | 1000 | 1000 | 1000 | 1000 | 1000 | | | | | | | | |
| 10 | 1001 | 1001 | 1001 | 1001 | 1001 | 1001 | | | | | | | | | |
| 11 | 1010 | 1010 | 1010 | 1010 | 1010 | | | | | | | | | | |
| 12 | 1011 | 1011 | 1011 | 1011 | | | | | | | | | | | |
| 13 | 1100 | 1100 | 1100 | | | | | | | | | | | | |
| 14 | 1101 | 1101 | | | | | | | | | | | | | |
| 15 | 1110 | | | | | | | | | | | | | | |

$X_{ccs}$ 1st bit, 2nd bit, 3rd b
$X_{ccs}$ 4th bit, 5th bit, 6th bit, 7th bit bit

Fig. 5

| Xccs | O | P | Xccs | O | P | Xccs | O | P | Xccs | O | P |
|---|---|---|---|---|---|---|---|---|---|---|---|
| 000 0000 | 1 | 1 | 010 0000 | 1 | 3 | 100 0000 | 1 | 5 | 110 0000 | 1 | 7 |
| 000 0001 | 2 | 1 | 010 0001 | 2 | 3 | 100 0001 | 2 | 5 | 110 0001 | 2 | 7 |
| 000 0010 | 3 | 1 | 010 0010 | 3 | 3 | 100 0010 | 3 | 5 | 110 0010 | 3 | 7 |
| Intermediate data (omitted) | | | | | | | | | | | |
| 000 1110 | 15 | 1 | 010 1110 | 2 | 13 | 100 1110 | 2 | 11 | 110 1110 | 2 | 9 |
| 000 1111 | 1 | 15 | 010 1111 | 1 | 13 | 100 1111 | 1 | 11 | 110 1111 | 1 | 9 |
| 001 0000 | 1 | 2 | 011 0000 | 1 | 4 | 101 0000 | 1 | 6 | 111 0000 | 0 | 0 |
| 001 0001 | 2 | 2 | 011 0001 | 2 | 4 | 101 0001 | 2 | 6 | 111 0001 | 0 | 0 |
| 001 0010 | 3 | 2 | 011 0010 | 3 | 4 | 101 0010 | 3 | 6 | 111 0010 | 0 | 0 |
| 001 0011 | 4 | 2 | 011 0011 | 4 | 4 | 101 0011 | 4 | 6 | 111 0011 | 0 | 0 |
| 001 0100 | 5 | 2 | 011 0100 | 5 | 4 | 101 0100 | 5 | 6 | 111 0100 | 0 | 0 |
| 001 0101 | 6 | 2 | 011 0101 | 6 | 4 | 101 0101 | 6 | 6 | 111 0101 | 0 | 0 |
| 001 0110 | 7 | 2 | 011 0110 | 7 | 4 | 101 0110 | 7 | 6 | 111 0110 | 0 | 0 |
| 001 0111 | 8 | 2 | 011 0111 | 8 | 4 | 101 0111 | 8 | 6 | 111 0111 | 0 | 0 |
| 001 1000 | 9 | 2 | 011 1000 | 9 | 4 | 101 1000 | 9 | 6 | 111 1000 | 8 | 8 |
| 001 1001 | 10 | 2 | 011 1001 | 10 | 4 | 101 1001 | 10 | 6 | 111 1001 | 7 | 8 |
| 001 1010 | 11 | 2 | 011 1010 | 11 | 4 | 101 1010 | 6 | 10 | 111 1010 | 6 | 8 |
| 001 1011 | 12 | 2 | 011 1011 | 12 | 4 | 101 1011 | 5 | 10 | 111 1011 | 5 | 8 |
| 001 1100 | 13 | 2 | 011 1100 | 4 | 12 | 101 1100 | 4 | 10 | 111 1100 | 4 | 8 |
| 001 1101 | 14 | 2 | 011 1101 | 3 | 12 | 101 1101 | 3 | 10 | 111 1101 | 3 | 8 |
| 001 1110 | 2 | 14 | 011 1110 | 2 | 12 | 101 1110 | 2 | 10 | 111 1110 | 2 | 8 |
| 001 1111 | 1 | 14 | 011 1111 | 1 | 12 | 101 1111 | 1 | 10 | 111 1111 | 1 | 8 |

WIRELESS COMMUNICATION APPARATUS, RECEIVING METHOD, AND MOBILE STATION

CROSS REFERENCE TO RELATED APPLICATION

This application is related to and claims priority to Japanese Application No. 2004-119554 filed Apr. 14, 2004 in the Japanese Patent Office, the contents of which are incorporated by reference herein.

BACKGROUND OF THE INVENTION

1. Field of the Invention

The present invention relates to a wireless communication apparatus which is suitably adapted to a mobile station in a mobile radio communication system introducing the W-CDMA (UTRA-FDD) communication system.

2. Description of the Related Art

Standardization of the W-CDMA (UTRA-FDD) system which is one of the 3rd generation mobile communication systems is now continued by the 3GPP (3rd Generation Partnership Project). As one of the themes of standardization, the HSDPA (High Speed Downlink Packet Access) which can provide the maximum transmission rate of about 14 Mbps in the downlink is regulated.

The HSDPA introduces the adaptive modulation and coding scheme (AMC) which is characterized by adaptively switching, for example, the QPSK modulation scheme and 16-level QAM scheme in accordance with the wireless environment between the base stations and mobile stations.

Moreover, the HSDPA employs the H-ARQ (Hybrid Automatic Repeat request) scheme. The H-ARQ is characterized by that the data is re-transmitted from a base station in response to a request from a mobile station and the mobile station performs the error correction decoding using both the already received data and received data re-transmitted when the mobile station has detected an error in the received data from the base station. As described above, in the H-ARQ scheme, the gain of error correction decoding can be increased and the number of times of re-transmission is controlled (reduced) by effectively utilizing the received data if an error is detected.

The main wireless channels used in the HSDPA include the HS-SCCH (High Speed Shared Control Channel), HS-PDSCH (High Speed Physical Downlink Shared Channel), and HS-DPCCH (High Speed Dedicated Physical Control Channel).

The HS-SCCH and HS-PDSCH are the shared channels in the downlink direction (namely, direction to the mobile station from the base station).

The HS-SCCH is the control channel for transmitting various parameters for the data to be transmitted by the HS-PDSCH. Various parameters include, for example, the modulation type information indicating the modulation scheme for transmitting the data with the HS-PDSCH, the number of assignment of spreading codes (number of spreading codes) and the information such as a rate matching pattern for the transmitting data.

However, the HS-SCCH is capable of simultaneously transmitting the control signal to a plurality of mobile stations utilizing a plurality of spreading codes (for example, four spreading codes) and the mobile station tries to perform the decoding (here, for example, the Viterbi decoding) to the signals obtained by despread with all (four) spreading codes.

A plurality of HS-SCCHs used for simultaneous transmission with a plurality of spreading codes are called a set of HS-SCCHs.

The data destined to the own mobile station can be identified from that destined to the other mobile stations by judging the HS-SCCH addressed to the own station among a set of HS-SCCHs to have sufficient difference in the final pathmetric values. When the control signal is transmitted via the HS-SCCH to the same mobile station with the continuous sub-frame, it is preferable to transmit the data with the same HS-SCCH among a set of HS-SCCHs (namely, to transmit the data with the same spread code) in view of alleviating the processing load of the mobile station.

Accordingly, when only one HS-SCCH among a set of HS-SCCHs has once detected the data destined to the own station on the basis of the pathmetric value or the like in the Viterbi decoding as described above, it is enough for the next continuous HS-SCCH to perform the despreading using the identical spreading code in place of conducting the despreading using all of the four despreading codes.

When the mobile station has detected the data is not destined to the own station based on the HS-SCCH, the despreading must be performed again using all of the four despreading codes.

Meanwhile, the HS-DPCCH is the dedicated control channel in the uplink direction (namely, direction to the base station from the mobile station) and is used when the mobile station transmits respectively the ACK signal and NACK signal to the base station in accordance with acknowledgment and non-acknowledgment of reception of the data received via the HS-PDSCH. If the mobile station fails reception of data (when a CRC error is generated in the receiving data or the like), the base station executes the re-transmission control because the NACK signal is transmitted from the mobile station.

Moreover, the HS-DPCCH is also used by the mobile station which has measured (measured for example within the period of the former sub-frame) the reception quality (for example, SIR) of the receiving signal received via the CPICH from the base station to transmit the CQI (Channel Quality Indicator) to the base station in accordance with the result of measurement The base station switches, when the wireless environment in the downlink direction is judged to be good based on the received CQI, the modulation scheme to the scheme which can transmit the data in the higher transmission rate. If the wireless environment is judged to be bad, on the contrary, the base station switches the modulation scheme to the scheme which can transmit the data in the lower transmission rate (namely, adaptive modulation is performed).

Channel Format

Next, a channel format in the HSDPA will be described below.

FIG. 1 is a diagram for illustrating a channel format in the HSDPA. Each channel is isolated with the spreading code because the W-CDMA adopts the code division multiple access scheme.

First, the channels not yet described will be explained briefly.

The CPICH (Common Pilot Channel) and P-CCPCH (Primary Common Control Physical Channel) are respectively common channels for the downlink direction and are also used in the ordinary communications in addition to the HSDPA.

The CPICH is the channel used in the mobile station for channel estimation, cell search and timing reference of the other downlink physical channel in the same cell. Namely, this CPICH is the channel for transmitting the pilot signal. The P-CCPCH is the channel for transmitting the broadcast information.

Next, the timing relationship of channels will be described with reference to FIG. 1.

As illustrated in the figure, each channel forms one frame (10 ms) with 15 slots. As described previously, since the CPICH is used as the reference of the other channels, the top of the frames of both P-CCPCH and HS-SCCH channels are matched with that of the frame of the CPICH channel. Here, the top of frame of the HS-PDSCH channel is delayed by two slots for the HS-SCCH or the like. It is necessary to perform the demodulation of the HS-PDSCH with the demodulation scheme corresponding to the modulation scheme received because the mobile station receives the modulation type information via the HS-SCCH channel. Moreover, the HS-SCCH and HS-PDSCH form one sub-frame with three slots.

The HS-DPCCH channel is not synchronized with the CPICH but it is the channel in the uplink direction and is based on the timing generated in the mobile station.

The channel format of the HSDPA has been described briefly above.

Next, contents and coding sequence of the data to be transmitted by the HS-SCCH channel will be described.

Data transmitted by the HS-SCCH

Following data can be transmitted with the HS-SCCH. Each data is mainly used for the reception process of the corresponding HS-PDSCH (delayed by two slots).

(1) $X_{ccs}$ (Channelization Code Set information)
(2) $X_{ms}$ (Modulation Scheme information)
(3) $X_{tbs}$ (Transport Block Size information)
(4) $X_{hap}$ (Hybrid ARQ Process information)
(5) $X_{rv}$ (Redundancy and constellation Version)
(6) $X_{nd}$ (New Data indicator)
(7) $X_{ue}$ (User Equipment identity)

Here, the $X_{ccs}$ of item (1) is the data indicating the spreading code used for transmission of the data through the HS-PDSCH (for example, data indicating the combination of the number of multi-codes and code offset) and is formed of 7 bits.

Moreover, the case where the spreading factor (SF) is 16 is considered here for more practical description.

When SF is 16, the spreading code of 16 kinds may be used. However, since the 0th spreading code is used for transmission of the broadcast information, the 1st to 15th codes may be used for the HS-PDSCH. Since the spreading codes used for transmission of the HS-PDSCH are used continuously (for example spreading code O, O+1, . . . , O+P−1), it is enough when O and P are transmitted after these are coded and converted into 7 bits under the condition that the top spreading code used is defined as O and the number of spreading codes used is defined as P.

Therefore, following coding method is thought as an example of the coding method.

1st to 3rd bits (code group indicator)
  min (P−1, 15−P)
4th to 7th bits (code offset indicator)
  |O−1−⌈P/8⌉×15|

Here, min (A, B) indicates a smaller one of A and B, while ⌈N⌉ indicates the maximum integer not exceeding N.

The data of 7 bits of $X_{ccs}$ has been defined above and the correspondence thereof is indicated in FIG. 2. According to FIG. 2, for example, it can be understood easily that when the data of $X_{ccs}$ corresponding to the case where P=5 and O=6 becomes "1000101" and the data of $X_{ccs}$ corresponding to the case where P=9 and O=2 becomes "1101110".

$X_{ms}$ of item (2) is the data indicating that the modulation scheme used for the HS-PDSCH is any one of the QPSK and 16-level QAM and is formed of one bit.

$X_{tbs}$ of item (3) is the data used for calculation of the transport block size (data size transmitted by one sub-frame of the HS-PDSCH) of the data transmitted by the HS-PDSCH and is formed of six bits.

$X_{hap}$ of item (4) is the data indicating the process number of the H-ARQ and is formed of three bits. The base station cannot judge acknowledgment or non-acknowledgement of the reception of data transmitted first in the mobile station until the ACK and NACK are received. However, since the transmission efficiency is lowered when the next new data is not transmitted until the reception of these data, the next new data is transmitted before reception of the ACK and NACK signals. While, since the H-ARQ is employed in the mobile station, when the re-transmission is performed, it must be recognized that with which data already received the data re-transmitted must be combined.

Therefore, before the transmission of each data via the HS-PDSCH the base station notifies the process number of the data to the mobile station. Then the mobile station identifies the data flow received via the HS-PDSCH by the process number and judges whether the mobile station combines the receiving data with the already received data, wherein the receiving data and the already received data belong to same flow (namely corresponding to same process number).

$X_{rv}$ of item (5) is the data indicating a rate matching pattern and a kind of constellation re-arrangement in the re-transmission of the HS-PDSCH and is formed of three bits.

$X_{nd}$ of item (6) is the data indicating whether the transmission block of the HS-PDSCH is the new block or re-transmission block and is formed of one bit.

$X_{ue}$ of item (7) is the data indicating the mobile station discriminating information and is formed of 16 bits.

Coding of data transmitted by HS-SCCH

FIG. 3 illustrates the coding sequence of each data (coding apparatus) of the items (1) to (7) transmitted by the HS-SCCH. The coding sequence is mainly executed in the base station.

In FIG. 3, the reference numeral 1 designates a coding unit; 2, a rate matching process unit; 3, a multiplier; 4, a CRC arithmetic unit; 5, a multiplier; 6, a coding unit; 7, a rate matching process unit; 8, coding unit; 9, a rate matching process unit.

Operations of each block will be described.

The $X_{ccs}$ (x1,1 to x1,7) (1) expressed with seven bits and $X_{ms}$ (x1,8) (2) expressed one bit are inputted to the coding unit 1 as the data in total of eight bits. Here, the former number of the subscripts means that it refers to the data to be transmitted with the first slot and the latter number partitioned by the comma (,) indicates the bit number.

The coding unit 1 adds the tail bits of eight bits to the input data and performs the convolutional coding process of the coding rate of 1/3 to the 16 bits in total. Therefore, the coded data becomes 48 bits in total and are given to the rate matching process unit 2 as z1,8 to z1, 48. The rate matching process unit 2 outputs the predetermined bits after adjustment to the number of bits (40 bits, in this case) accommodated within the first slot by performing the puncture and repetition process or the like (r1,1 to r4,40).

The data from the rate matching process unit 2 is multiplied with c1 to c40 with the multiplier 3 and are outputted as s1,1 to s1,40 and are then transmitted by the first slot (first part) as the top slot of one sub-frame in the HS-SCCH of FIG. 1.

Here, c1 to c40 have been obtained by moreover conducting bit adjustment similar to that in the rate matching process unit 2 with the rate matching process unit 9 to the b1 to b48 which has been obtained by the convolutional coding in the coding rate of 1/2, after addition of the tail bits of eight bits, of the data from the $X_{ue}$ (7) ($X_{ue}$ 1 to $X_{ue}$ 16) in the coding unit 8.

Meanwhile, the $X_{tbs}$ (3)(x2,1 to x2,6) of six bits, $X_{hap}$ (4) (x2,7 to x2,9) of three bits, $X_{rv}$ (5) (x2,10 to x2,12) of three bits, $X_{nd}$ (1) (x2,13) of one bit are inputted as y2,1 to y2,13 in total of thirteen bits to the coding unit 6 and moreover inputted thereto as y2,1 to y2,29 in total of 29 bits with addition of y2,14 to y2,29 of 16 bits.

Here, y2,14 to y2,29 have been obtained by conducting the CRC arithmetic process in the CRC arithmetic unit 4 to the total of 21 bits of (1) to (6) and then multiplying $X_{ue}$ (7)($X_{ue}$ 1 to $X_{ue}$ 16) as the result of arithmetic operation.

The data y2,1 to y2,29 inputted to the coding unit 6 are inputted, after addition of the tail bits of 8 bits, to the rate matching process unit 7 as the data of 111 bits of z2,1 to z2,111 through the convolutional coding with the coding rate of 1/3.

The rate matching process unit 7 outputs the 80 bits of r2,1 to r2,80 with the process such as puncture process described above and these data r2,1 to r2,80 are transmitted with the 2nd and 3rd slots (second part) in one sub-frame in the HS-SCCH of FIG. 1.

As described above, the data are separately transmitted with individual slots, for example, the data of (1) and (2) with the first slot, while the data of (3) to (6) with the second and third slots. However, these are subjected in common to the CRC arithmetic operation and transmitted as the result of CRC arithmetic operation within the second slot. Accordingly, a reception error can be detected by perfectly receiving both first and second slots.

Moreover, since the data transmitted with the first slot is multiplied with $X_{ue}$ (7) with the multiplier 3 after the convolutional coding by the coding unit 1, when the data addressed to the other station is received with the first slot, difference in the final pathmetric values becomes small and it is proved that such data is never addressed to the own station with considerable possibility.

Contents in relation to the HSDPA described above are disclosed, for example, in 3rd generation Partnership Project: Technical Specification Group Radio Access Network; Multiplexing and channel coding (FDD) (3G TS 25.212) and 3rd generation Partnership Project: Technical Specification Group Radio Access Network; Physical layer procedures (FDD) (3G TS 25.214).

According to the background described above, a mobile station receives the first, second, and third slots of the HS-SCCH received from the base station and also receives, when there is no error in the result of CRC arithmetic operation, the data of HS-PDSCH which is received after the delay of two slots for the HS-SCCH.

However, acquisition of the result of CRC arithmetic operation requires total reception of HS-SCCH formed of three slots and results in a problem that a certain time is required until the result can be obtained.

Therefore, it is considered here to detect a reception error, for example, because a difference in the pathmetric values is small, by performing the Viterbi decoding or the like. However, setting of threshold to define such difference level is rather difficult. When the threshold is set to the lower level, decision in the earlier stage of reception error becomes considerably difficult because decision is made almost depending on the result of CRC arithmetic operation.

Therefore, one of the objects of the present invention is to detect the reception error of the HS-SCCH in the earlier stage or with higher accuracy.

Moreover, as described above, when the data is transmitted with the same HS-SCCH among the set of HS-SCCHs (namely, transmitted with the same spreading code) in view of alleviating the load of process of the mobile station, if any HS-SCCH among the set thereof is decided to be addressed to the own station incorrectly, the despreading is conducted with the spreading code for the same HS-SCCH for the sub-frame of the next HS-SCCH for which the result is continuous. Accordingly, the reception of the continuous HS-SCCH becomes difficult because of spreading of decision error of the HS-SCCH. Therefore, it is essential, from such point of view, to consider the enhancement in the receiving accuracy of the HS-SCCH as the object of the present invention.

While it is detected that the HS-SCCH is not addressed to the own station, it is required to conduct the despread using all of four despreading codes.

In addition to the object described above, it is also considered as the object of the present invention to provide the effect which can be attained with each structure described in the preferred embodiments of the present invention and cannot be realized with the prior art.

SUMMARY OF THE INVENTION

Accordingly, one of the purposes of this invention is to make transmissions controllable, taking into consideration the effects of the channels on which transmissions are made in a burst state.

Furthermore, not restricted to the above-mentioned purpose, it can also be proposed that one of the purposes of this invention is to attain results not available to conventional technology as the result of the various configurations indicated as the best to implement the invention described hereinafter.

In one embodiment of the present invention, a wireless communication apparatus comprises a receiver operable to receive data and a control signal that is started in transmission prior to transmission of the data and a detecting unit operable to detect that undefined data is included in a first part of the control signal that is transmitted prior to a second part of the control signal. The apparatus is operable as a mobile station utilizing HSDPA used in the WCDMA mobile communication system, the control signal is transmitted via HS-SCCH, the first part of the control signal is based on $X_{ccs}$ and $X_{ms}$, the second part is based on $X_{tbs}$, $X_{hap}$, $X_{rv}$, and $X_{nd}$, and the undefined data comprises undefined data as $X_{ccs}$. The apparatus further comprises a control unit operable to control a demodulator or a decoder not to perform not to perform a demodulation or a decoding process of at least a part of the data based on the detection result. The control unit is operable to control the demodulator or the decoder not to perform a demodulation or a decoding process of at least a part of the second part of the control signal.

In one embodiment of the present invention, a receiving method for a wireless communication apparatus comprises the steps of receiving data and a control signal that is started in transmission prior to transmission of the data, detecting that particular data is included in a first part of the control signal that is transmitted prior to transmission of a second part of the control signal, and controlling a demodulation or a decoding process of at least a part of the data is not performed based on the control signal. The wireless communication apparatus is operable as a mobile station utilizing HSDPA used in the WCDMA mobile communication system, the control signal is transmitted via HS-SCCH, the first part of the control signal is based on $X_{ccs}$ and $X_{ms}$, the second part is based on $X_{tbs}$, $X_{hap}$, $X_{rv}$, and $X_{nd}$, and the particular data comprises data as $X_{ccs}$. The controlling step further comprises controlling a demodulation or a decoding process of at least a part of the second part of the control signal is not performed.

In one embodiment of the present invention, a mobile station which is capable of receiving a signal transmitted via HS-SCCH and HS-PDSCH from a base station adopting to HSDPA, the mobile station comprises a detecting unit operable to detect that $X_{ccs}$ transmitted via HS-SCCH comprises undefined data.

In one embodiment of the present invention, the mobile station, further comprises a receiver operable to receive data and a control unit operable to control demodulation or decoding of at least a part of the data responsive to the detecting unit detecting that the $X_{ccs}$ transmitted via HS-SCCH comprises undefined data. The $X_{ccs}$ and $X_{ms}$ are transmitted in a first part of a control signal and $X_{tbs}$, $X_{hap}$, $X_{rv}$, and $X_{nd}$ are transmitted in a second part of the control signal. The control unit is further operable to control demodulation or decoding of at least a part of the second part of the control signal.

In one embodiment of the present invention, a receiving method for a mobile station utilizing HSDPA, the method comprises the steps of detecting that decoded $X_{ccs}$ corresponds to defined data, and deciding that a control signal received via a HS-SCCH doesn't include contradiction.

In one embodiment of the present invention, a receiving method for a mobile station utilizing HSDPA, the method comprises the steps of detecting that decoded $X_{ccs}$ doesn't correspond to undefined data, and deciding that a control signal received via a HS-SCCH doesn't include a contradiction.

BRIEF DESCRIPTION OF THE DRAWINGS

FIG. 2 is a diagram showing the relationship between O, P, and each bit of $X_{ccs}$.

FIG. 5 is a diagram showing a conversion table.

DETAILED DESCRIPTION OF THE PREFERRED EMBODIMENTS

The preferred embodiments of the present invention will be described with reference to the accompanying drawings.

Description of the First Embodiment

As described previously, the top slot of one sub-frame transmitted by the HS-SCCH includes the (1) $X_{ccs}$ and (2) $X_{ms}$ but attention is paid in this embodiment to the $X_{ccs}$ (1).

$X_{ccs}$ is the data indicating the spreading code which is used for transmission of the data via the HS-PDSCH which has been obtained by coding the top spreading code number and number of spreading codes as described above. When discussion on the table of FIG. 2 suggests that the larger the value of P becomes, the kinds of O which can be selected is decreased. Since the total number of O when P is 1 and 15 becomes 16, the number of bits for indicating the spreading codes used can be lowered by using in common the 1st to 3rd bits for P=1 (N) and P=15 (16−N) and the 4th to 7th bits which can express 16 kinds of O.

However, further discussion will proves that any pair does not exist for P=8 which is the center value of P and only eight kinds of O ("1111" to "1000") are expressed with the 4th to 7th bits. That is, the remaining eight kinds of O ("0111" to "0000") are not yet defined (it is not scheduled that the data is transmitted to a certain mobile station from the base station).

Accordingly, the present invention enables detection of reception error by detecting that the $X_{ccs}$ obtained by reception through the HS-SCCH is not yet defined.

Figure 1:
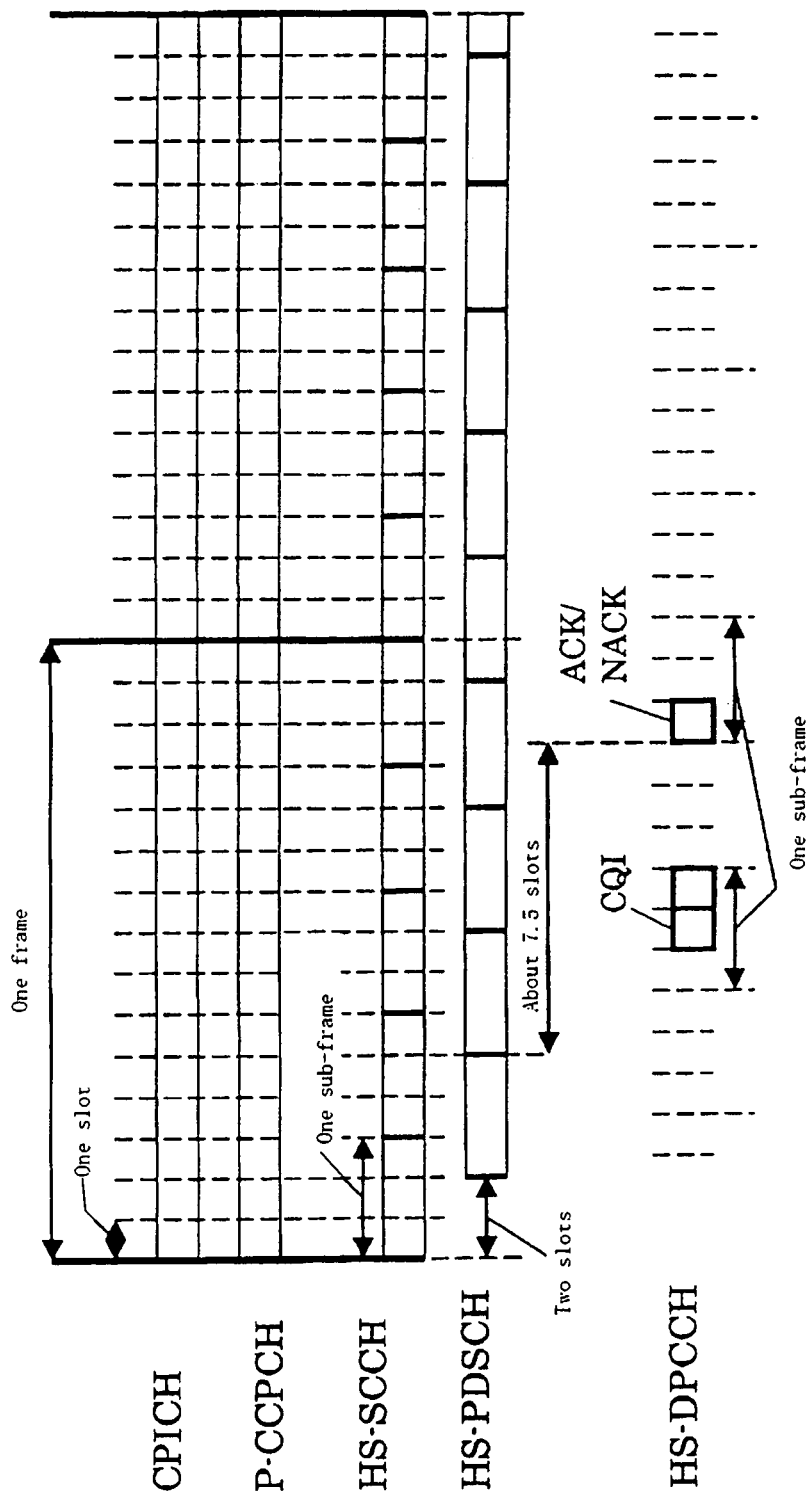
FIG. 1 is a diagram showing a channel format in the HSDPA.
Figure 3:
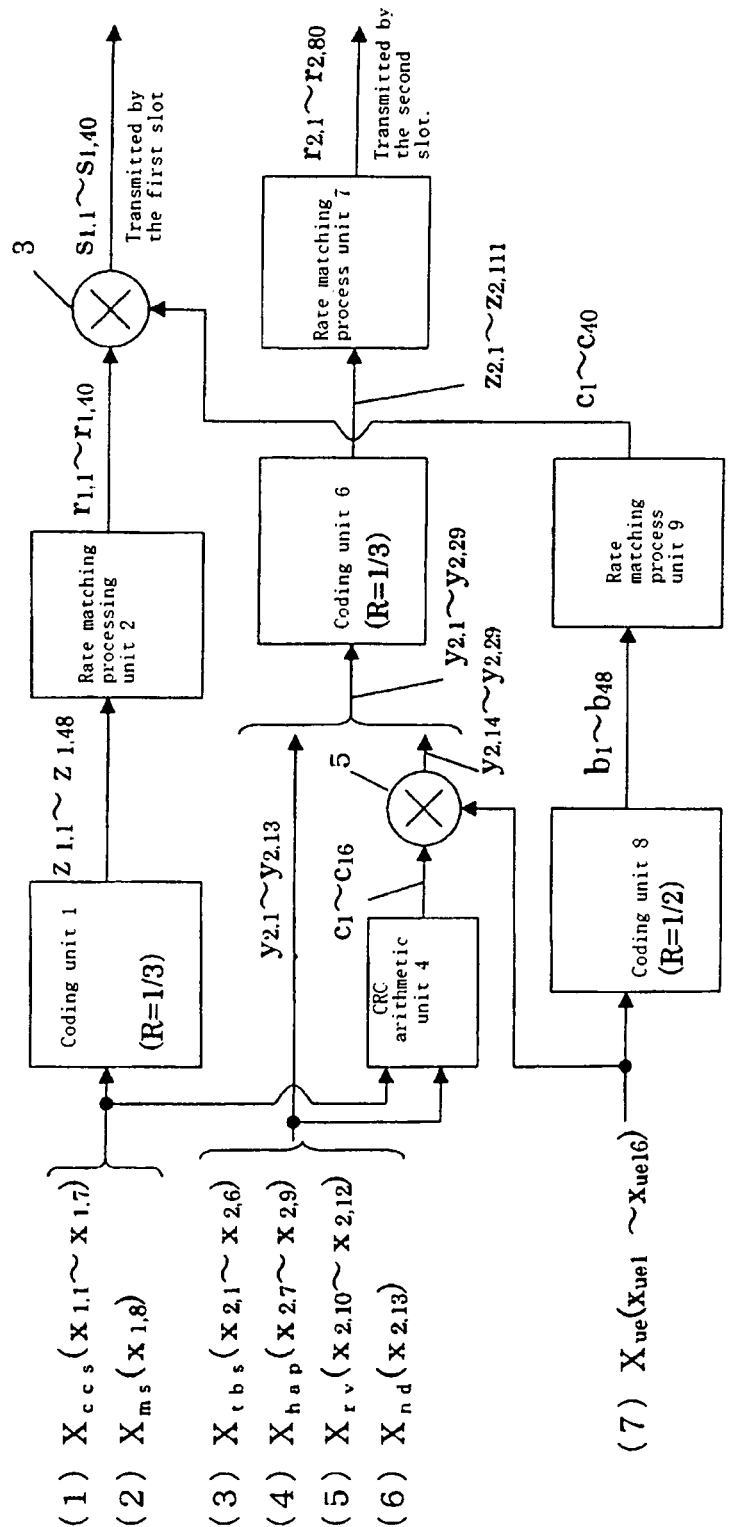
FIG. 3 is a diagram showing a coding apparatus for HS-SCCH.
Figure 4:
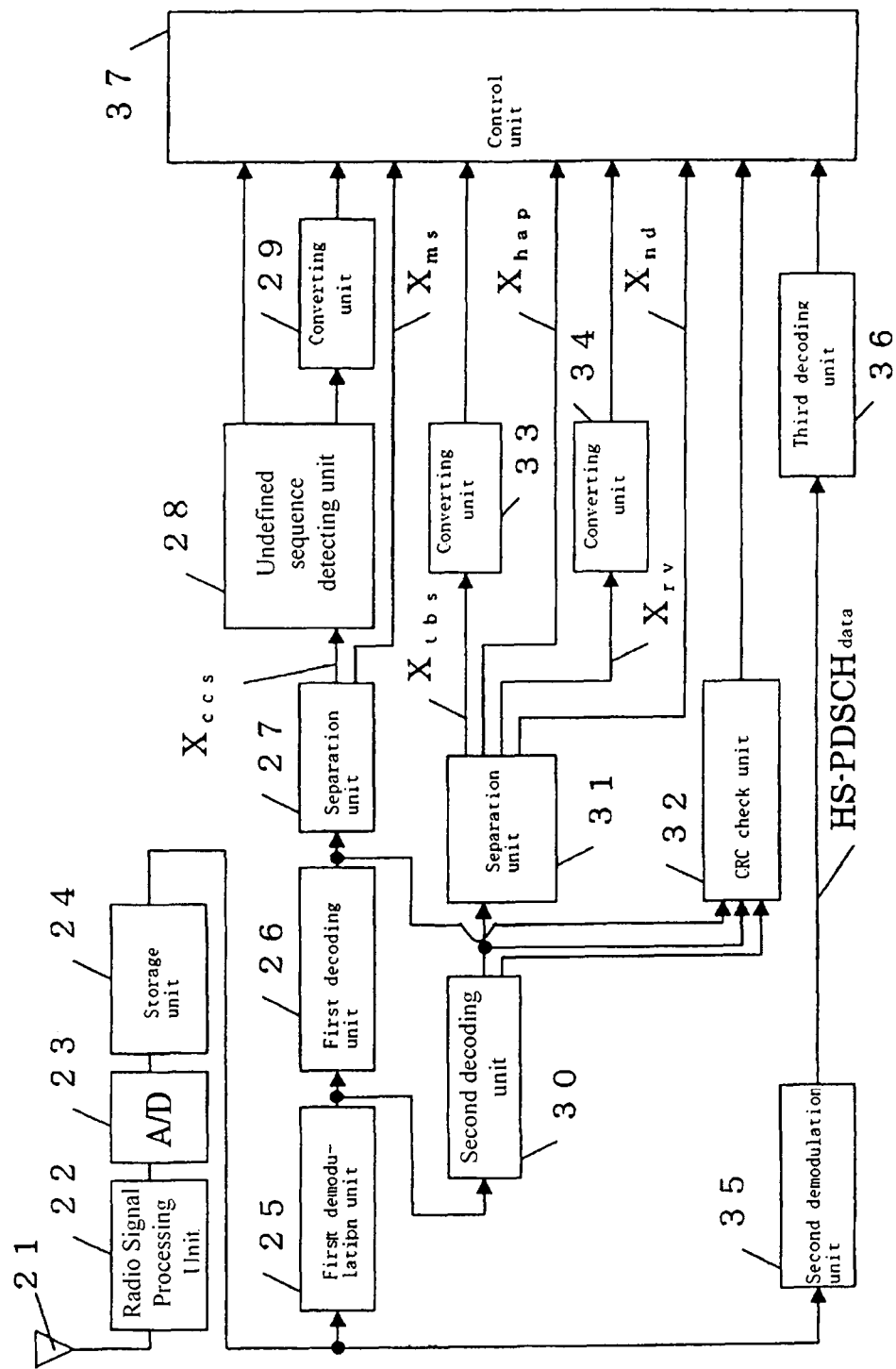
FIG. 4 is a diagram showing a structure of the wireless communication apparatus (mobile station) in the present invention.

FIG. 4 illustrates a communication apparatus in the present invention.

As an example of the wireless communication apparatus, a mobile station used in the W-CDMA (UTRA-FDD) communication system corresponding to the HSDPA described previously will be described. This mobile station of the present invention can also be adapted to the communication apparatus in the other communication system.

In this figure, 21 designates an antenna; 22, a radio signal processing unit for executing the radio signal process such as down-conversion to the radio signal; 23, an A/D converting unit for converting the analog signal converted to the intermediate frequency to the digital signal; 24, a storage unit for storing the receiving signal converted to the digital signal with the A/D converting unit; 25, a first demodulating unit for conducting the demodulation process (quadratic detection, despreading process or the like) of the HS-SCCH; 26, a first decoding unit for decoding a first slot of the HS-SCCH. As the decoding unit, it is preferable to use a Viterbi decoder.

Numeral 27 designates an separation unit for separating the $X_{ccs}$ and $X_{ms}$ included in the first slot; 28, an undefined sequence detecting unit for detecting the undefined sequence based on the $X_{ccs}$ and transmitting the result of detection to the control unit 37 described later; 29, a converting unit 29 for giving the corresponding P value and O value to the control unit 37 described later on the basis of the defining sequence as the sequence other than the undefined sequence.

Numeral 30 designates a second decoding unit for decoding the second and third slots of the HS-SCCH. It is preferable to use the Viterbi decoder as the decoding unit.

Numeral 31 designates a separation unit for separating and outputting the $X_{tbs}$, $X_{hap}$, $X_{rv}$, and $X_{nd}$ included in the second and third slots.

Numeral 33 designates a converting unit for giving the data to the control unit 37 after conversion to the corresponding data length information on the basis of $X_{tbs}$; 34, a converting unit for giving the data to the control unit 37 after conversion to the corresponding information such as rate matching parameter on the basis of $X_{rv}$.

Numeral 35 designates a second demodulation unit for conducting the demodulation process such as quadratic detection and despreading (the kind of the detection scheme and the number of despreading codes used for despreading depend on the data of the first part in the sub-frame of the just preceding HS-SCCH) for the signal transmitted via the HS-PDSCH; 36, a third decoding unit for conducting the decoding process such as turbo-decoding to the data of HS-PDSCH.

The mobile station as the wireless communication apparatus illustrated in FIG. 4 is provided with a transmitting unit for transmitting the signals of CQI, ACK, and NACK from the control unit 37 as the radio signal from the antenna 21. However, such transmitting unit is not illustrated.

Next, operations of the wireless communication apparatus illustrated in FIG. 4 will be described.

The mobile station in the communicating condition using the HSDPA periodically receives the HS-SCCH because the HS-PDSCH is the shared channel and is required to check whether the data addressed to the own station is transmitted with the HS-PDSCH or not.

Therefore, the mobile station receives the data with the antenna 21, converts the signal down-converted with the radio signal processing unit 22 into the digital signal with the A/D converting unit 23, stores the data to the storage unit 24, and inputs the digital signal to the first demodulation unit 25.

Since the first demodulation unit 25 is the demodulation unit for demodulation of the HS-SCCH, it despreads, as described above, the receiving signal using, for example, the four kinds of spreading codes and then inputs the data (first slot part) to the first decoding unit 26 after the despread.

The first decoding unit 26 multiplies c1 to c40 and input signal together, wherein the c1 to c40 are similar to c1 to C40 output by the rate matching unit 9 on the basis of the $X_{ue}$ (7). And the first decoding unit 26 inserts the data having 0 degree of likeliness, wherein the bit portion in which the data having 0 degree of likeliness is inserted is similar to the bit portion of bits deleted (punctured) by the rate matching process in the rate matching process unit 2.

Here, the degree of likeliness of data is set to 0 to equalize the influence on the decision of 1 and 0 in the decoding process.

Thereafter the first decoding unit 26 performs the decoding process with the Viterbi decoding or the like.

The data decoded by the first decoding unit 26 is separated into the $X_{ccs}$ and $X_{ms}$ in the separation unit 27 and the $X_{ccs}$ (1) is then inputted to the undefined sequence detecting unit 28.

The undefined sequence detecting unit 28 decides whether the $X_{ccs}$ corresponds to the undefined bit sequences (particular data) "1110000", "1110001", "1110010", "1110011", "1110100", "1110101", "1110110", and "1110111" or not. When the $X_{ccs}$ corresponds to these undefined bit sequences, the undefined sequence detecting unit 28 informs such correspondence to the control unit 37 (it is also possible that when the $X_{ccs}$ does not correspond, on the contrary, such condition is informed to the control unit 37). In any case, the control unit 37 detects the undefined bit sequence in result.

Here, a method for easily detecting the correspondence to the undefined bit sequence will be described below.

Detecting Method in the Undefined sequence Detecting unit 28

Here, it is detected that the 1st to 4th bits are "1110".

Accordingly, since it is no longer required to detect that all bits correspond to the predetermined bit sequence (5th to 7th bits are not checked), detection is rather easy. It is preferable to use an arithmetic circuit which outputs 1 as the result of arithmetic operation when "1110" is inputted or outputs 0 in other cases.

The control unit 37, which is informed by the undefined sequence detecting unit 28 that the received control signal ($X_{ccs}$) corresponds to the undefined bit sequence (or not informed by the undefined sequence detecting unit 28 that the received control signal ($X_{ccs}$) corresponds to the defined bit sequence), makes decision that the control information (HS-SCCH) received from the base station includes contradiction because the decoded $X_{ccs}$ includes contradiction.

The control unit 37, which has decided that the control information includes contradiction, controls any one of the radio signal processing unit 22, A/D converting unit 23, storage unit 24, second demodulation unit 35, third decoding unit 36, and control 37 (including all of a plurality of desired combinations of these units (for example, combination of the second demodulation unit 35 and third decoding unit 36 or the like)) not to perform the operation for a part or the entire part of one sub-frame of the HS-PDSCH corresponding (delayed by two slots) to the sub-frame of the HS-SCCH. The power feeding to these units is preferably suspended.

Accordingly, the control unit 37 is capable of detecting, with higher accuracy, that the HS-PDSCH is not addressed to the own station earlier than the CRC check.

More preferably, the control unit 37, which has decided that the control information includes contradiction, controls (or both of) the radio signal processing unit 22, A/D converting unit 23, storage unit 24, first demodulation unit 25, second decoding unit 30, separation unit 31, converting unit 33, converting unit 34, CRC check unit 32 and control unit 37 (including all of a plurality of desired combinations of these units (for example, combination of the first demodulation unit 25 and second decoding unit 30 or the like)) not to perform the operation for the second and the third slot or one of these slots as the subsequent slots of the sub-frame of the HS-SCCH including the contradiction in the $X_{ccs}$ Preferably, power feeding to each unit is suspended.

Accordingly, it can be detected, on the basis of the $X_{ccs}$ of first slot, with higher accuracy that the HS-SCCH is not addressed to the own station and it is also possible to control the second or third slot not to perform the operation thereof.

Moreover, as described previously, when the control signal is transmitted to the mobile station via the HS-SCCH with the continuous sub-frames, it is also possible to transmit the data with the same HS-SCCH (namely, transmission with the same spreading code) among the set of HS-SCCHs. In this embodiment, when the undefined sequence is received and detected in the undefined sequence detecting unit 28, it is preferable to perform the control to conduct the demodulation process to all of the subsequent HS-SCCH sets. Namely, when the set of HS-SCCHs includes four HS-SCCHs, the despreading is executed with the first demodulation unit 25 using the four kinds of spreading codes.

In this embodiment, the undefined sequence detecting unit 28 informs, as an example, the detecting result to the control unit 37, but it is also possible that the undefined sequence detecting unit 28 directly informs to such object unit not to perform the operation in case that the undefined bit sequence is detected or the defined bit sequence is not detected. In this case, the undefined sequence detecting unit 28 functions as a part of the control unit.

On the other hand, the control unit 37 decides, when it is not informed that the undefined bit sequence is detected (or is informed that the undefined bit sequence is not detected), that there is no contradiction in the decoded $X_{ccs}$ and therefore there is not any contradiction in the received control information (such received control information is consistent). In this case, demodulation and decoding operations of the second and third slots of the subsequent HS-SCCH and demodulation and decoding operations of HS-PDSCH are performed. However, it is allowed that the demodulation and decoding operations are not performed with the reason that an error is generated in the result of CRC arithmetic operation for the HS-SCCH and the other reasons.

Next, the decoding process of the second and third slots and the HS-PDSCH will be described briefly.

The second decoding unit 30 performs the decoding process for the second and third slots and gives the result of decoding to the separation unit 31 and CRC check unit 32. The separation unit 31 separates the second and third slots inputted to the $X_{tbs}$, $X_{hap}$, $X_{rv}$, and $X_{nd}$ and then outputs these data.

The $X_{tbs}$ is converted by the converting unit 33 to the data length information indicating the length of the data in one sub-frame transmitted via the HS-PDSCH and the data length information is given to the control unit 37 for the recognition of the data length in the one sub frame. Moreover, the $X_{hap}$ is given in direct to the control unit 37 as the process number to discriminate, as described above, the object data to be combined. The $X_{rv}$ is converted to the rate matching pattern information or the like by the unit 34 and the rate matching pattern information or the like is given to the control unit 37 to enable the rate matching or the like in one sub-frame to be transmitted by the HS-PDSCH. The $X_{nd}$ is the bits indicating new transmission or re-transmission of data to be transmitted by the corresponding HS-PDSCH and is given in direct to the control unit 37.

Meanwhile, both CRC bits, which is included in the second part (the second and third slots), calculated by the CRC arithmetic operation and the data as the object of the CRC arithmetic operation in the transmitting side are inputted to the CRC check unit 32. This CRC check unit 32 compares the result obtained by the CRC arithmetic operation for the CRC arithmetic operation object with the CRC bits received and performs the check for existence or no-existence of CRC error on the basis of matching (or mismatching) of these elements.

The result of CRC check is given to the control unit 37 and it is preferable, when an error is detected by the CRC check, that the control unit controls each subsequent operation not to perform for the HS-PDSCH even if the undefined sequence is not detected with the undefined sequence detecting unit 28.

The second demodulation unit 35 performs demodulation and outputs the result of demodulation when the undefined sequence is not detected with the undefined sequence detecting unit 28 (moreover, when no-error is detected by the CRC check). Here, it is required to complete the reception of the HS-SCCH up to the third slot for obtaining the CRC arithmetic. However, since the HS-PDSCH has already been started for reception when the third slot is received, if the undefined sequence is not yet detected by the undefined sequence detecting unit 28, it is also possible for the second demodulation unit 35 and third decoding unit 36 to start the demodulation process and decoding process of the first slot of the HS-PDSCH. If the CRC error is detected later, it is enough when the data of HS-PDSCH obtained by the parallel process is cancelled.

If the second demodulation unit 35 or third decoding unit 36 do not start demodulation and decoding process of the first slot of HS-PDSCH until the CRC arithmetic (check) operation is performed, the receiving data is stored in the storage unit 24 and the demodulation and/or decoding may also be performed by reading the stored data of the storage unit 24 after making reference to the CRC arithmetic (check) operation result which is performed when the undefined sequence is not detected.

It is more preferable that even if the undefined sequence is not detected with the undefined sequence detecting unit 28, when the pathmetric value of each path, for example, calculated by the decoding of the first decoding unit 26 (or the second decoding unit 30) is accommodated within the difference in the predetermined range, the parallel process of the second demodulation unit 35 and third decoding unit is not performed.

The first embodiment has been described above, but it is also possible to use the first demodulation unit 25 and second demodulation unit 35 as the common unit and also use the first decoding unit 26 and second decoding unit 30 as the common unit.

In this case, it should be noted that the process for the signals in the same slot can be realized easily with the time division processes.

Description of Second Embodiment

In the first embodiment, the undefined sequence detecting unit 28 and converting unit 29 are provided individually but it is also possible for the second embodiment that these units are used in common and defined as the undefined sequence detecting unit 28' with the converting function in view of ruling out the converting unit 29.

An example of the undefined sequence detecting unit 28' with the converting function can be realized with a memory in which modification is made to contents of data to be stored.

Namely, the undefined sequence detecting unit 28' with the converting function stores combination of O and P as a table using the $X_{ccs}$ illustrated in FIG. 5 as the address. Here, as the modification, 0, 0 are stored as the combination of O and P for the undefined "1110000" to "1110111" (within the thick line in the figure) as the $X_{ccs}$.

Accordingly, when the combination of O and P is read using the $X_{ccs}$ given from the separation unit 31 as the read address, one or more O and P are outputted when the $X_{ccs}$ is already defined but O and P are respectively outputted as 0, 0 when $X_{ccs}$ is not yet defined. Thereby, the control unit 37 can detect that the $X_{ccs}$ is not yet defined.

Operations after detection of the undefined sequence is similar to that in the first embodiment. It is preferable, here, that the operations of at least the third decoding unit 36, for example, are not performed so that the control unit 37 does not perform the control for transmitting unwanted signal to the base station on the basis of the receiving signal which is not addressed to the own station.

Since an output of the undefined sequence detecting unit 28' with the converting function under the undefined condition is fixed to P=0 which means the number of codes used is 0, it can be prevented effectively that the HS-PDSCH is erroneously received by setting erroneous inverse spreading code to the second demodulation unit 35.

According to the wireless communication apparatus of the present invention, a reception error in the HS-SCCH can be detected in the earlier stage or with higher accuracy.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A wireless communication apparatus comprising:
    a receiver configured to receive data and a control signal that is started in transmission prior to transmission of the data;
    a detector configured to detect, before error detection based on a CRC calculation, that undefined data having a predetermined pattern is included in a first part of the control signal that is transmitted prior to a second part of the control signal having a CRC calculation result used for the error detection of the control signal; and
    a controller configured to control demodulation or decoding of at least a part of the data responsive, to the detector detecting that information transmitted via the control signal comprises undefined data.

2. The wireless communication apparatus according to claim 1, wherein the apparatus is configured as a mobile station utilizing HSDPA used in the WCDMA mobile communication system, the control signal is transmitted via HS- SCCH, the first part of the control signal is based on channelization code set information and modulation scheme information, the second part is based on transport block size information, Hybrid ARQ process information, redundancy and constellation version, and new data indicator, and the undefined data comprises undefined data as channelization code set information.

3. The wireless communication apparatus according to claim 1, wherein:
the controller is configured to control a demodulator or a decoder not to perform a demodulation or a decoding process of the at least a part of the data based on the detection result signal.

4. The wireless communication apparatus according to claim 3, wherein the controller is configured to control the demodulator or the decoder not to perform a demodulation or a decoding process of at least a part of the second part of the control signal.

5. The wireless communication apparatus according to claim 3, wherein the controller further comprises controlling a demodulation or a decoding process of at least a part of the second part of the control signal is not performed.

6. A receiving method for a wireless communication apparatus comprising:
receiving data and a control signal that is started in transmission prior to transmission of the data;
detecting that particular data having a predetermined pattern is included in a first part of the control signal, before error detection based on a CRC calculation, that is transmitted prior to transmission of a second part of the control signal having a CRC calculation result used for the error detection of the control signal; and
controlling a demodulation or a decoding process of at least a part of the data is not performed based on the control signal.

7. The receiving method according to claim 6, wherein the wireless communication apparatus is configured as a mobile station utilizing HSDPA used in the WCDMA mobile communication system, the control signal is transmitted via HS-SCCH, the first part of the control signal is based on channelization code set information and modulation scheme information, the second part is based on transport block size information, Hybrid ARQ process information, redundancy and constellation version, and new data indicator, and the particular data comprises data as channelization code set information.

8. A mobile station for receiving a signal transmitted via HS-SCCH and HS-PDSCH from a base station adopting to HSDPA, the mobile station comprising:
a detector configured to detect, before error detection based on a CRC calculation, that channelization code set information transmitted via HS-SCCH comprises undefined data, which has a predetermined pattern and is not transmitted from the base station as the channelization code set information, and which is transmitted prior to a control signal having a CRC calculation result used for error detection of the control signal;
a receiver configured to receive data; and
a controller configured to control demodulation or decoding of at least a part of the data responsive, to the detector detecting that the channelization code set information transmitted via HS-SCCH comprises undefined data.

9. A mobile station according to claim 8, wherein: the channelization code set information and modulation scheme information are transmitted in a first part of the control signal; and transport block size information, Hybrid ARQ process information, redundancy and constellation version, and new data indicator are transmitted in a second part of the control signal.

10. A mobile station according to claim 9, wherein the controller is further configured to control demodulation or decoding of at least a part of the second part of the control signal.

11. A wireless communication apparatus comprising:
a receiver configured to receive data and a control signal used for receiving process of the data;
a detector configured to detect, before error detection based on a CRC calculation, that undefined data having a predetermined pattern is included in a control signal, which is transmitted prior to transmission of a CRC calculation result used for the error detection of the control signal; and
a controller configured to control demodulation or decoding of at least a part of the data responsive, to the detector detecting that information transmitted via the control signal comprises undefined data.

* * * * *